United States Patent
Zieger et al.

(10) Patent No.: US 9,707,677 B2
(45) Date of Patent: Jul. 18, 2017

(54) CLOSURE DEVICE

(71) Applicant: Robert Bosch GmbH, Stuttgart (DE)

(72) Inventors: Jens Zieger, Altbach (DE); Uwe Engelfried, Ostfildern (DE); Thomas Duerr, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/410,075

(22) PCT Filed: May 15, 2013

(86) PCT No.: PCT/EP2013/059986
§ 371 (c)(1),
(2) Date: Dec. 20, 2014

(87) PCT Pub. No.: WO2014/000953
PCT Pub. Date: Jan. 3, 2014

(65) Prior Publication Data
US 2015/0321375 A1 Nov. 12, 2015

(30) Foreign Application Priority Data

Jun. 28, 2012 (DE) .................. 10 2012 211 098

(51) Int. Cl.
*B27B 17/02* (2006.01)
*B25F 5/02* (2006.01)
(Continued)

(52) U.S. Cl.
CPC .............. *B25F 5/02* (2013.01); *B27B 17/02* (2013.01); *B23D 57/023* (2013.01); *B65D 43/16* (2013.01); *Y10T 403/59* (2015.01)

(58) Field of Classification Search
CPC ...... B23Q 1/303; B23Q 16/001; B65D 43/16; A45C 13/1084; A45C 13/123;
(Continued)

(56) References Cited

U.S. PATENT DOCUMENTS 2,788,889 A * 4/1957 Turnbow ............... B23Q 13/00
206/349
3,464,240 A * 9/1969 Brody ................. E05B 65/5269
292/163
(Continued)

FOREIGN PATENT DOCUMENTS

CN 102189519 A 9/2011
CN 102355986 A 2/2012
(Continued)

OTHER PUBLICATIONS

International Search Report corresponding to PCT Application No. PCT/EP2013/059986, mailed Jan. 8, 2014 (German and English language document) (5 pages).

*Primary Examiner* — Larry E Waggle, Jr.
*Assistant Examiner* — Mahdi H Nejad
(74) *Attorney, Agent, or Firm* — Maginot, Moore & Beck LLP (57) ABSTRACT

A closure device, in particular a tool-holder closure device, includes at least one movably mounted closure element and at least one securing unit. The securing unit includes at least one movably mounted securing element configured to secure the closure element in at least one position thereof. The closure device further includes at least one stop unit which has at least one stop element. The stop element, depending on at least one position of the closure element, is configured to stop the securing element at least largely against a movement relative to the closure element.

10 Claims, 2 Drawing Sheets

(51) Int. Cl.
*B23D 57/02* (2006.01)
*B65D 43/16* (2006.01)

(58) Field of Classification Search
CPC .......... A45C 2005/037; A45C 13/1092; A45C 13/06; Y10S 292/38; Y10S 292/11; Y10S 292/48; Y10S 292/49; Y10S 292/50; Y10T 292/0862; Y10T 292/0911; Y10T 292/0917; Y10T 292/0918; Y10T 292/0921; Y10T 292/0922; Y10T 292/0923; Y10T 292/0925; Y10T 292/0934; Y10T 292/1043; Y10T 403/59; Y10T 292/202; B25F 5/02; B23D 57/023
USPC .................. 269/900; 296/224; 206/373, 541; 190/119; 292/56, 95, 113, 116–118, 120, 292/114, 128, 194, 202, DIG. 11, 292/DIG. 49, DIG. 50

See application file for complete search history.

(56) References Cited

U.S. PATENT DOCUMENTS

| | | | |
|---|---|---|---|
| 3,797,870 A | 3/1974 | Beckman | |
| 4,938,513 A * | 7/1990 | Gunderson | E05C 19/066 292/80 |
| 8,979,141 B2 * | 3/2015 | Lee | D06F 39/14 292/121 |
| 2005/0067840 A1 * | 3/2005 | Koveal | E05B 47/0012 292/95 |
| 2006/0001276 A1 * | 1/2006 | Vitry | B60R 5/04 292/216 |
| 2007/0029811 A1 * | 2/2007 | Kostuchowski | G01R 31/2893 292/95 |
| 2008/0308568 A1 * | 12/2008 | Grenier | A45C 13/1084 220/810 |
| 2011/0222981 A1 | 9/2011 | Derler et al. | |
| 2012/0032569 A1 * | 2/2012 | Hill | D06F 39/12 312/228 |
| 2014/0333074 A1 * | 11/2014 | Wollacott | E05C 3/006 292/202 |
| 2015/0071598 A1 * | 3/2015 | Badura | G02B 6/4494 385/135 |
| 2015/0158199 A1 * | 6/2015 | Engelfried | B27B 17/02 30/383 |
| 2015/0290830 A1 * | 10/2015 | Zieger | B27B 17/02 30/383 |
| 2015/0321378 A1 * | 11/2015 | Engelfried | B23D 57/023 30/383 |
| 2015/0321381 A1 * | 11/2015 | Engelfried | B23D 57/023 30/382 |
| 2016/0159570 A1 * | 6/2016 | Reeb | B65F 1/1615 220/324 |

FOREIGN PATENT DOCUMENTS

| | | | |
|---|---|---|---|
| CN | 102448677 A | | 5/2012 |
| EP | 2 309 190 A2 | | 4/2011 |
| WO | 2007/103798 A1 | | 9/2007 |
| WO | 2010/105809 A1 | | 9/2010 |
| WO | WO2010105809 | * | 9/2010 |
| WO | WO2010105809 A | * | 9/2010 |

* cited by examiner

CLOSURE DEVICE

This application is a 35 U.S.C. §371 National Stage Application of PCT/EP2013/059986, filed on May 15, 2013, which claims the benefit of priority to Serial No. DE 10 2012 211 098.4, filed on Jun. 28, 2012 in Germany, the disclosures of which are incorporated herein by reference in their entirety.

BACKGROUND

Closure devices which include a movably mounted closure element and a fixing unit which comprises a movably mounted fixing element for fixing the closure element in at least one position of the closure element are already known.

SUMMARY

The disclosure proceeds from a closure device, in particular a tool holder closure device, having at least one movably mounted closure element and having at least one fixing unit which comprises at least one movably mounted fixing element for fixing the closure element in at least one position of the closure element.

It is proposed that the closure device comprises at least one locking unit which includes at least one locking element which locks the fixing element at least extensively against a movement relative to the closure element in dependence on at least one position of the closure element. In this connection, the closure device can be realized as a box closure device, such as, for example, a tool box closure device or as a hand-held machine tool box closure device. In a particularly preferred manner, the closure device is realized as a tool holder closure device. However, it is also conceivable for the closure device to comprise another development that appears sensible to an expert. The term "movably mounted", in this case, is to define in particular a bearing arrangement of a unit and/or of an element relative to at least one further unit and/or relative to a further element, the unit and/or the element, in particular decoupled from elastically deforming the unit and/or the element and decoupled from movement possibilities that are produced due to bearing play, comprising a movement possibility along at least one axis along a section greater than 1 mm, in a preferred manner greater than 10 mm and in a particularly preferred manner greater than 20 mm and/or a movement possibility about at least one axis by and angle greater than 10°, in a preferred manner greater than 45° and in a particularly preferred manner greater than 60°.

A "closure element" is to be understood in this context in particular as an element which is provided, in at least one position, in particular in a closure position, for the purpose of exerting a holding force onto a further element that is abutting against the closure element or fixing or closing two components that are movable relative to one another. The term "provided" is to be understood, in particular, as especially programmed, designed and/or equipped. The closure element is realized in a preferred manner as a tool holder element of a tool holder. The tool holder is provided in a preferred manner for the purpose of receiving a tool holder in a positive locking and/or non-positive locking manner or of fixing a machine tool separating device on a basic body of the tool holder by means of a positive locking and/or by means of non-positive locking connection by means the closure element. For fixing a machine tool separating device on the basic body in a preferred manner by means of a positive locking connection, the closure element exerts a holding force in the direction of the basic body onto a guide unit of the machine tool separating device. For transmitting driving forces to the machine tool separating device, the machine tool separating device is preferably received by the tool holder or is fixed on the basic body of the tool holder. In this connection, at least in a fixing position, the closure element preferably exerts a holding force onto the machine tool separating device, in particular in at least a state with the machine tool separating device connected to the tool holder. In addition, the closure element is preferably mounted so as to be pivotable about a movement axis of the closure element. In this connection, the movement axis of the closure element extends in a preferred manner at least substantially parallel to a clamping face of the closure element.

In this connection, it is conceivable for the closure element to be acted upon with a spring force of a spring element of the closure device in at least one position, in particular in a disengaging position, of the closure element. The term "substantially parallel" is to be understood in this context in particular as an alignment of a direction relative to a reference direction, in particular in one plane, the direction deviating from the reference direction in particular by less than 8°, in an advantageous manner by less than 5° and in a particularly advantageous manner by less than 2°. The clamping face of the closure element is preferably provided for the purpose of abutting against a machine tool separating device that is arranged in the tool holder in the fixing position, in particular against a guide unit of the machine tool separating device. As a result, a holding force is exerted onto the machine tool separating device by means of the clamping face of the closure element in a fixing position of the closure element.

The term "locking unit" in this context in particular is to define a unit which is provided for the purpose of preventing, at least extensively, by means of a positive locking and/or non-positive locking connection, a movement of an element relative to a further element, in particular of preventing, at least extensively, a movement of an element relative to a further element in two oppositely directed directions. In a particularly preferred manner, the locking unit is provided for the purpose of fixing the fixing element, at least in a disengaging position of the closure element, against a movement relative to the closure element. In the disengaging position of the closure element, a machine tool separating device is preferably able to be removed from or inserted into a receiving recess of a basic body of the tool holder. The locking unit or the locking element preferably releases a movement of the fixing element in a fixing position of the closure element. Consequently, the fixing element is movable relative to the closure element in a fixing position of the closure element. The fixing element is movable into a locking position in a fixing position of the closure element. In a locking position of the fixing element, the closure element is fixed on the basic body of the tool holder at least by means of the fixing element against a movement of the closure element into a disengaging position of the closure element. By means of the development according to the disclosure of the closure device, convenient operability can be achieved in an advantageous manner. In addition, an unintended movement of the fixing element into a locking position of the fixing element in a disengaging position of the closure element can be avoided in an advantageous manner by means of the locking element. Consequently, an adverse effect of a movement of the closure element, proceeding from a disengaging position of the closure element, into a fixing position of the closure element as a consequence of a fixing element that has already been moved into a locking position can be avoided in an advantageous manner.

In addition, it is proposed that the locking element is arranged so as to be movable on the fixing element. The term "arranged so as to movable" is to be understood in this context in particular as a movable bearing arrangement of the locking element on the fixing element or an arrangement of the locking element on the fixing element which enables a movement of at least one part region of the locking element relative to the fixing element, in particular as a result of the locking element deforming elastically. Consequently, transferring the locking element from a locking position into a release position can be achieved in a structurally simple manner.

In addition, it is proposed that the locking element is realized integrally with the fixing element. The term "integrally" is to be understood in particular as at least positive material bonding, for example as a result of a welding process, an adhesive process, a spray-on process and/or another process that appears sensible to the expert, and/or is to be understood as formed advantageously in one piece, such as, for example, as a result of production from a casting and/or as a result of production using a single or multiple component injection method and in an advantageous manner from one single blank. However, it is also conceivable for the locking element to be realized separately from the fixing element and to be mounted so as to be movable on the fixing element. A compact locking unit can be achieved in an advantageous manner by means of the development according to the disclosure of the closure device. In addition, installation space, assembly expenditure and costs can be saved in an advantageous manner.

In addition, it is proposed that the locking element is realized as a resilient continuation. A "resilient continuation" is to be understood in this context in particular as an element which changes its original shape and/or its original alignment relative to a further element under the influence of a force and, when the influencing force is taken away, returns into the original shape and/or assumes the original alignment again relative to the further element and consequently generates a counter force that works against deformation. However, it is also conceivable for the locking element to be realized as a rigid element which is acted upon with a spring force of a spring element of the locking unit. Other developments that appear sensible to an expert are also conceivable. By means of the development according to the disclosure, automatic resetting of the locking element into a locking position of the locking element can be achieved in an advantageous manner. Consequently, greater operating convenience can be achieved in an advantageous manner.

In addition, it is proposed that the locking unit includes at least one stop element against which the locking element abuts for locking the fixing element in at least one position of the locking element. In a preferred manner, the stop element is realized integrally with the closure element. However, it is also conceivable for the stop element to be realized separately from the closure element and to be fastened on the closure element by means of at least one fastening element which appears sensible to an expert. The fixing element is able to be locked in a structurally simple manner as a result of a positive locking connection between the locking element and the stop element. In addition, a compact closure device can be achieved in an advantageous manner.

In addition, it is proposed that the locking unit includes at least one disengaging element which moves the locking element away from a stop element of the locking unit for mobility of the fixing element. In a preferred manner, the disengaging element is provided for the purpose of moving the locking element away from a stop element of the locking unit as a result of a movement of the closure element. The disengaging element is preferably realized integrally with the basic body of the tool holder. However, it is also conceivable for the disengaging element to be mounted movably on the closure element or movably on the fixing element such as, for example, as a slide etc. By means of the development according to the disclosure, in an advantageous manner a locking of the fixing element can be lifted in order to enable the fixing element to move relative to the closure element.

In addition, it is proposed that the disengaging element comprises at least one inclined face which, as a result of a movement of the closure element, exerts a force component onto the locking element in the direction of a release position of the locking element. The locking element is moved into contact with the inclined face of the disengaging element as a result of a movement, in particular a pivoting movement, of the closure element. Sliding friction can be utilized in an advantageous manner for transferring the locking element into a release position of the locking element. Consequently, a deflection of the locking element can be achieved in an advantageous manner for moving the locking element into a release position. In addition, a movement-dependent or position-dependent releasing of the locking element can be achieved in an advantageous manner.

In addition, it is proposed that the fixing element is mounted on the closure element so as to be pivotable. In this connection, a movement axis of the fixing element extends in a preferred manner at least substantially parallel to the movement axis of the closure element. A principle of a lever can be utilized in an advantageous manner to generate an actuating force. In addition, a toggle lever principle can be realized in an advantageous manner for fixing the closure element.

In addition, the disclosure proceeds from a tool holder with a closure device according to the disclosure. The closure device is preferably arranged on a basic body of the tool holder. The basic body, in a preferred manner, is mounted so as to be rotatable on a machine tool housing of a machine tool. As a result, in an advantageous manner a tool holder that can be securely closed and conveniently operated can be realized.

In addition, the disclosure proceeds from a machine tool with a tool holder according to the disclosure. In a particularly preferred manner, the machine tool is realized as a portable machine tool. The tool holder, in a preferred manner, is provided for positive and/or non-positive coupling with a machine tool separating device. A "portable machine tool" is to be understood in this context in particular as a machine tool, in particular a hand-held machine tool, which is able to be transported by an operator without a transporting machine. The portable machine tool comprises in particular a mass which is smaller than 40 kg, in a preferred manner smaller than 10 kg and in a particularly preferred manner smaller than 5 kg. A machine tool on which a machine tool separating device is able to be arranged in a particularly convenient manner can be advantageously achieved.

In a particularly preferred manner, the machine tool and the machine tool separating device form a machine tool system. The machine tool separating device, in a preferred manner, includes at least one cutting train and at least one guide unit, which together with the cutting train forms a closed system. Consequently, the machine tool separating device itself is realized in a preferred manner as a closed system. A "cutting train" is to be understood in this context in particular as a unit which is provided for the purpose of locally eliminating an atomic cohesion of a workpiece to be machined, in particular by means of mechanically cutting off and/or by means of mechanical removing material particles of the workpiece. In a preferred manner, the cutting train is provided for the purpose of separating the workpiece into at least two parts that are physically separate from one another and/or of cutting off and/or removing at least in part material particles of the workpiece proceeding from a surface of the workpiece. The cutting train, in a preferred manner, is realized as a cutting chain. However, it is also conceivable for the cutting train to comprise another development that appears sensible to an expert such as, for example, a development as a cutting line on which cutting elements are fixed.

The term "guide unit" is to define in this context in particular a unit which is provided for the purpose of exerting a constraining force onto the cutting train at least along a direction perpendicular to a cutting direction of the cutting train in order to define a movement possibility of the cutting train along the cutting direction. A "cutting direction" is to be understood in this context in particular as a direction along which the cutting train is moved to generate a cutting gap and/or to cut off and/or to remove material particles of a workpiece to be machined in at least one operating state as a result of a driving force and/or a driving torque, in particular in the guide unit. In a preferred manner, the cutting train is moved in an operating state relative to the guide unit along the cutting direction. The term "closed system" is to define in this context in particular a system which includes at least two components which, by means of interaction, with the system in a disassembled state, retain a functionality from a system that is higher-ranking to the system, in particular the tool holder, and/or which are captively connected to one another in the disassembled state. In a preferred manner, the at least two components of the closed system are connected together in a manner that is at least substantially non-disengageable for the operator. "At least substantially non-disengageable" is to be understood in this context in particular as a connection between at least two components which are separable from one another only by using separating tools, such as, for example, a saw, in particular a mechanical saw, etc., and/or chemical separating agents such as, for example, solvents etc.

The machine tool separating device, in particular when viewed along a direction that extends at least substantially perpendicularly to a cutting plane of the machine tool separating device, comprises a maximum dimension that is smaller than 10 mm, in a preferred manner smaller than 8 mm and in a particularly preferred manner smaller than 5 mm. The dimension is preferably realized as the width of the machine tool separating device. In a particularly preferred manner, the machine tool separating device, when viewed along the direction that extends at least substantially perpendicularly to the cutting plane of the machine tool separating device, comprises an at least substantially constant maximum dimension along an overall length of the machine tool separating device. Consequently, the machine tool separating device is preferably provided for the purpose of generating a cutting gap which, when viewed along the direction that extends at least substantially perpendicularly to a cutting plane of the machine tool separating device, comprises a maximum dimension that is smaller than 5 mm. By means of the machine tool system, an adaptation to different fields of application can be achieved in a particularly convenient manner by the machine tool separating device being removable in an advantageous manner from the tool holder.

The closure device according to the disclosure, the tool holder according to the disclosure and/or the machine tool according to the disclosure is/are not to be restricted, in this connection, to the above-described application and embodiment. In particular, the closure device according to the disclosure, the tool holder according to the disclosure and/or the machine tool according to the disclosure can comprise a number of individual elements, components and units that deviates from the number named herein to fulfill a method of operation described herein.

BRIEF DESCRIPTION OF THE DRAWINGS

Further advantages are produced from the following description of the drawing. An exemplary embodiment of the disclosure is shown in the drawing. The drawing, the description and the claims include numerous features in combination. In an expedient manner, the expert will also observe the features individually and combine them to form sensible further combinations.

The drawing is as follows.

DETAILED DESCRIPTION

Figure 1:
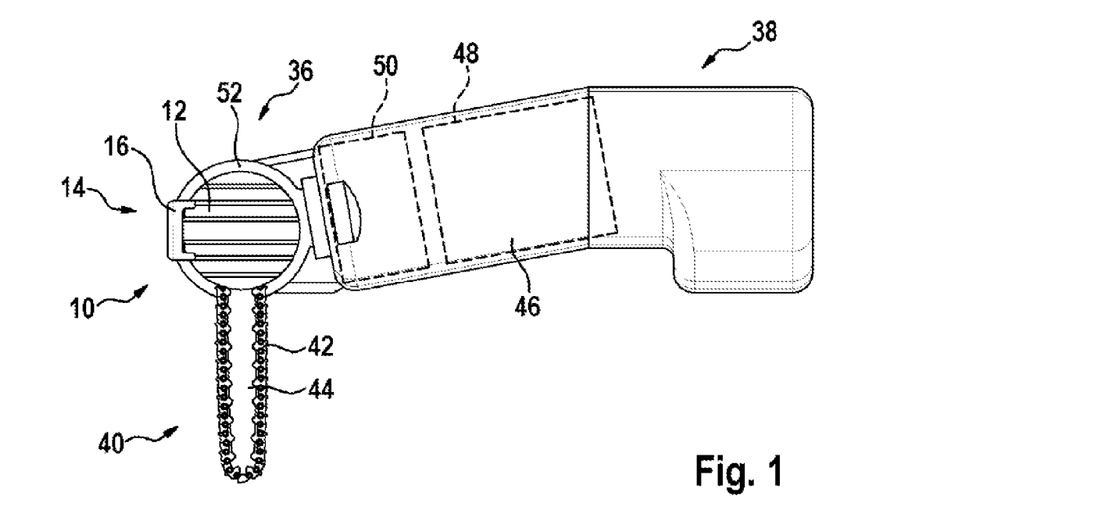
FIG. 1 shows a schematic representation of a portable machine tool according to the disclosure with a tool holder according to the disclosure and FIG. 2 shows a schematic representation of a view of a detail of the tool holder according to the disclosure in a state disassembled from the portable machine tool according to the disclosure with a closure device according to the disclosure.

FIG. 1 shows a machine tool 38 formed by a portable machine tool with a tool holder 36 for a positive locking and/or non-positive locking coupling of a machine tool separating device 40. The portable machine tool 38 and the machine tool separating device 40 together form a machine tool system. The machine tool separating device 40 includes at least one cutting train 42 and at least one guide unit 44 for guiding the cutting train 42. The guide unit 44 and the cutting train 42 together form a closed system. Consequently, the machine tool separating device 40 is realized as a closed system. In addition, the machine tool 38 comprises a machine tool housing 46 which surrounds a drive unit 48 and a transmission unit 50 of the machine tool 38. The drive unit 48 and the transmission unit 50 are connected together operatively in a manner that is already known to an expert to generate a driving torque which is transmittable to the machine tool separating device 40. The transmission unit 50 is realized as a miter gear. The drive unit 48 is realized as an electric motor unit. However it is also conceivable for the drive unit 48 and/or the transmission unit 50 to comprise a different development that appears sensible to an expert, such as, for example, a development of the drive unit 48 as a hybrid drive unit or as an internal combustion drive unit etc., and/or a development of the transmission unit 50 as a worm gear etc. The drive unit 48 is provided for the purpose of driving the cutting train 42 of the machine tool separating device 40 in at least one operating state by means of the transmission unit 50. In this connection, the cutting train 42 is moved in the guide unit 44 of the machine tool separating device 40 along a cutting direction of the cutting train 42 relative to the guide unit 44. The cutting train 42 is moved circulating around the guide unit 44 in operation.

Figure 2:
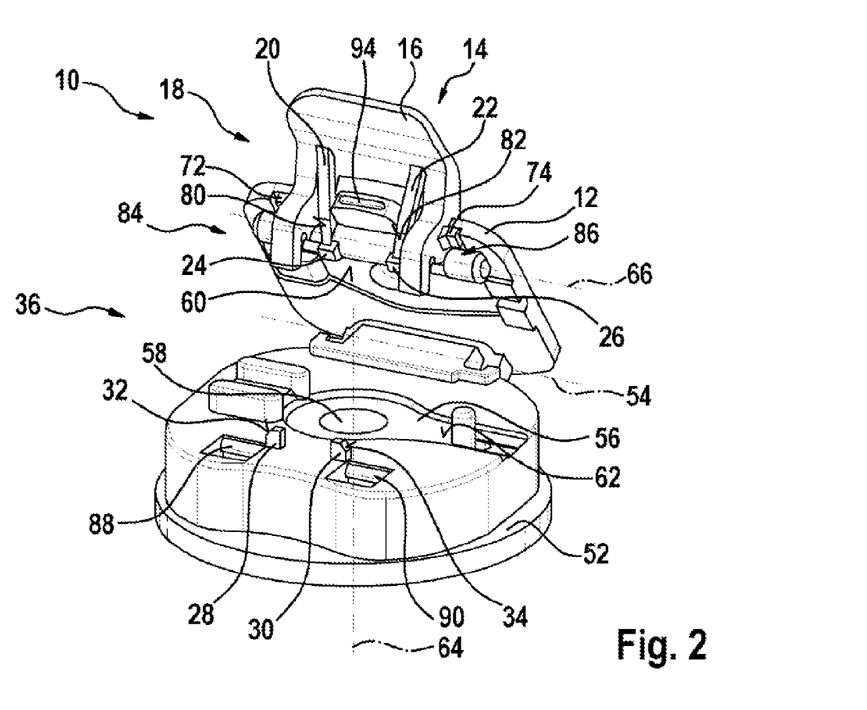

The tool holder 36 is provided for receiving the machine tool separating device 40 realized as a closed system. In this connection, the tool holder 36 includes at least the closure device 10 and a basic body 52. The basic body 52 is mounted on the machine tool housing 46 of the machine tool 38 so as to be rotatable. The basic body 52 is mounted on the machine tool housing 46 so as to be rotatable about a rotational axis 64 of the basic body 52 that is at least substantially parallel to a rotational axis of a drive element (not shown in any more detail here) of the tool holder 36 and/or of the machine tool 38. For fixing a rotational position of the basic body 52 relative to the machine tool housing 46, the machine tool 38 comprises at least one rotational positioning unit (not shown in any more detail here). The closure device 10 is arranged on the basic body 52 of the tool holder 36. Consequently, the closure device 10 is realized as a tool holder closure device. In addition, the closure device 10 includes at least one movably mounted closure element 12 and at least one fixing unit 14 which comprises at least one movably mounted fixing element 16 for fixing the closure element 12 in at least one position of the closure element 12. The closure element 12 is realized as a tool holding element. In this connection, the closure element 12 is mounted on the basic body 52 so as to be pivotable about a movement axis 54 of the closure element 12 which extends at least substantially parallel to a clamping face 60 of the closure element 12.

The basic body 52 comprises a receiving recess 56 for at least partially receiving the machine tool separating device 40 in a state with the machine tool separating device 40 coupled to the tool holder 36. The receiving recess 56 of the basic body 52 and the clamping face 60 of the closure element 12 interact for fixing the machine tool separating device 40 on the tool holder 36 in a positive locking and/or non-positive locking manner. As a result, in a state with the machine tool separating device 40 arranged on the tool holder 36, a holding force is exerted onto the machine tool separating device 40. In addition, the receiving recess 56 comprises a form that corresponds with a part region of a periphery of the machine tool separating device 40. Consequently, forces and/or torques in a cutting plane of the machine tool separating device 40 are supported on the tool holder 36 by means of the receiving recess 56.

In addition, the basic body 52 comprises a rotational play opening 58 in which the drive element (not shown in any more detail here) of the tool holder 36 and/or of the machine tool 38 is arranged. The drive element is provided for the purpose of transmitting a driving force of the drive unit 48 to the cutting train 42. Consequently, the drive element, in a state with the machine tool separating device 40 connected to the tool holder 36, engages in the cutting train 42. In this connection, the drive element engages in drive recesses of cutting train segments of the cutting train 42 (not shown in any more detail here).

In addition, the closure device 10 includes at least one locking unit 18 which includes at least one locking element 20 which locks the fixing element 16 at least extensively against a movement relative to the closure element 12 in dependence on at least one position of the closure element 12. In this connection, the locking element 20 locks the fixing element 16 at least extensively against a movement relative to the closure element 12 in a disengaging position of the closure element 12. In a disengaging position of the closure element 12, the closure element 12 is arranged pivoted in a direction directed away from the basic body 52 relative to the basic body 52. Consequently, the clamping face 60 of the closure element 12, in a disengaging position of the closure element 12, is aligned at least substantially transversely with respect to a stop face 62 of the basic body 52 which defines the receiving recess 56. The stop face 62 of the basic body 52, in this connection, at least substantially perpendicularly to the rotational axis 64 of the basic body 52. In a fixing position of the closure element 12, in which a holding force for fixing the machine tool separating device 40 in a positive locking and/or non-positive locking manner can be exerted onto the machine tool separating device 40 by means of the closure element 12 and the stop face 62, the clamping face 60 of the closure element 12 is aligned at least substantially parallel to the stop face 62.

Figure 4:
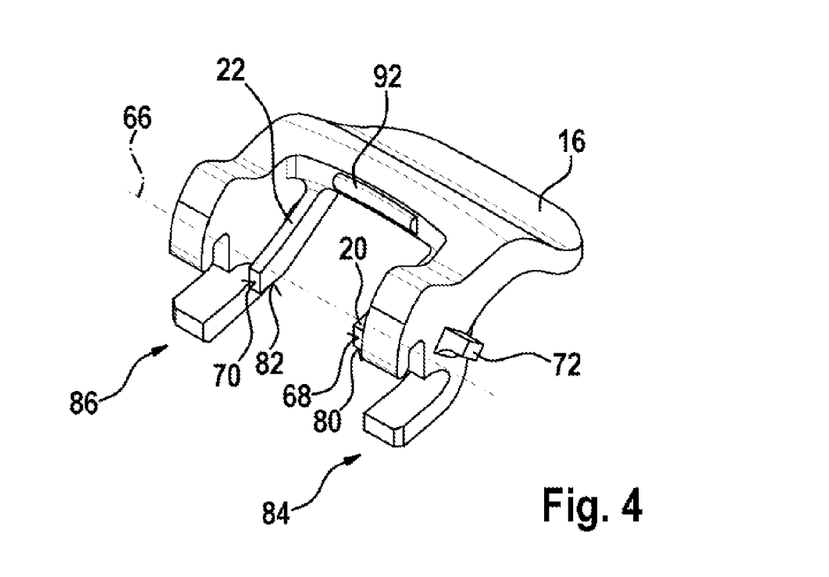

The locking element 20 is arranged so as to be movable on the fixing element 16 for locking the fixing element 16. In this connection, the locking element 20 is realized integrally with the fixing element 16. For movably arranging the locking element 20 on the fixing element 16, the locking element 20 is realized as a resilient continuation. The locking unit 18 comprises additionally a further locking element 22 which is arranged so as to be movable on the fixing element 16 for locking the fixing element 16. Consequently, the locking unit 18 includes at least two locking elements 20, 22 which lock the fixing element 16 at least extensively against a movement relative to the closure element 12 in dependence on at least one position of the closure element 12. However, it is also conceivable for the locking unit 18 to include a number of locking elements 20, 22 that deviates from two. The further locking element 22 is also realized integrally with the fixing element 16. Consequently, the further locking element 22 is also realized as a resilient continuation for movably arranging the further locking element 22 on the fixing element 16. The locking element 20 and the further locking element 22 comprise an at least substantially analogous development. In this connection, the locking element 20 and the further locking element 22 are arranged on the fixing element in a mirror-symmetrical manner with respect to a plane that extends at least substantially perpendicularly to a movement axis 66 of the fixing element 16. However, it is also conceivable for the locking element 20 and the further locking element 22 to comprise a different arrangement on the fixing element 16 that appears sensible to an expert, such as, for example, an arrangement that is offset with reference to the movement axis 66 of the fixing element 16 etc. The fixing element 16, in this connection, is mounted on the closure element 12 so as to be pivotable. Consequently, the movement axis 66 of the fixing element 16 is realized as a pivot axis. The movement axis 66 of the fixing element 16 extends at least substantially parallel to the movement axis 54 of the closure element 12.

Figure 3:
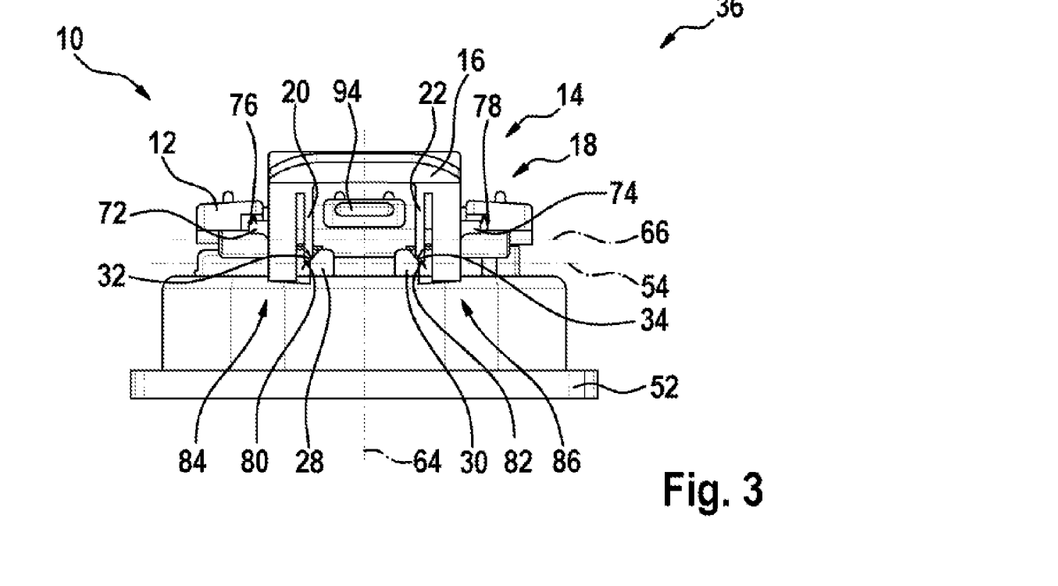
FIG. 3 shows a schematic representation of a view of a further detail of the tool holder according to the disclosure in a state disassembled from the portable machine tool according to the disclosure with the closure device according to the disclosure and FIG. 4 shows a schematic representation of a view of a detail of a fixing element of the closure device according to the disclosure.

In addition, the locking unit 18 includes at least one stop element 24 against which the locking element 20 abuts for locking the fixing element 16 in at least one position of the locking element 20. The stop element 24 is integrally molded onto the closure element 12 in a region of the movement axis 66 of the fixing element 16. The locking element 20, in this connection, abuts against the stop element 24 by way of an end face 68 for locking the fixing element 16 in dependence on a position of the closure element 12. The locking unit 18 additionally includes at least one further stop element 26, against which the further locking element 22 abuts for locking the fixing element 16 in at least one position of the further locking element 22. The further stop element 26 is also integrally molded onto the closure element 12 in a region of the movement axis 66 of the fixing element 16. The further locking element 22, in this connection, abuts against the further stop element 26 by way of an end face 70 for locking the fixing element 16 in dependence on a position of the closure element 12. Consequently, the locking unit 18 includes at least two stop elements 24, 26, against which the locking element 20 or the further locking element 22 abuts for locking the fixing element 16 in at least one position of the locking element 20 or of the further locking element 22. However, it is also conceivable for the locking unit 18 to include a number of stop elements 24, 26 which deviates from two.

The stop element 24 and the further stop element 26 are arranged on the closure element 12 in a mirror-symmetrical manner with regard to a plane that extends at least substantially perpendicularly to the movement axis 66 of the fixing element 16. By means of interaction between the locking element 20 and the further locking element 22 and the stop element 24 and the further stop element 26, the fixing element 16 is prevented at least extensively from moving in the direction of a locking position of the fixing element 16 in dependence on a position of the closure element 12.

In addition, the fixing element 16 includes at least one stop continuation 72 and a further stop continuation 74 (FIGS. 2 to 4) which are provided for the purpose of defining a movement of the fixing element 16 relative to the closure element 12 in a direction that is opposed to a movement in the direction of the locking position of the fixing element 16. In this connection, the stop continuation 72 and the further stop continuation 74 in each case interact with a stop face 76, 78 of the closure element 12.

In addition, the locking unit 18 includes at least one disengaging element 28 which moves the locking element 20 away from the stop element 24 of the locking unit 18 for mobility or for release of the fixing element 16 for movement. The disengaging element 28 is provided for the purpose of moving the locking element 20 away from the stop element 24 of the locking unit 18 in dependence on a movement of the closure element 12 relative to the basic body 52 for mobility or for release of the fixing element 16 for movement. In this connection, the disengaging element 28 is realized integrally with the basic body 52. The locking unit 18 additionally comprises a further disengaging element 30 which moves the further locking element 22 away from the further stop element 26 of the locking unit 18 for mobility or for release of the fixing element 16 for movement. The further disengaging element 30 is provided for the purpose of moving the further locking element 22 away from the further stop element 26 of the locking unit 18 in dependence on a movement of the closure element 12 relative to the basic body 52 for mobility or for release of the fixing element 16 for movement. In this connection, the further disengaging element 30 is also realized integrally with the basic body 52. The disengaging element 28 and the further disengaging element 30 are in each case integrally molded onto the basic body 52 as a continuation. In this connection, the disengaging element 28 and the further disengaging element 30 extend in a direction directed away from the basic body 52 at least substantially perpendicularly to the stop face 62 of the basic body 52. The disengaging element 28 and the further disengaging element 30 in each case comprise at least one inclined face 32, 34 which exerts a force component in the direction of a release position of the locking element 20 or of the further locking element 22 onto the locking element 20 or onto the further locking element 22 as a result of a movement of the closure element 12. Consequently, the fixing element 16 cannot be moved into a locking position of the fixing element 16 until the locking element 20 and the further locking element 22 are moved by the disengaging element 28 and the further disengaging element 30 into a release position of the locking element 20 and of the further locking element 22 in dependence on a movement of the closure element 12 proceeding from a disengaging position of the closure element 12 into a fixing position of the closure element 12.

For coupling the machine tool separating device 40 with the tool holder 36, the machine tool separating device 40 is inserted into the receiving recess 56 of the basic body 52. The closure element 12 is situated, in this connection, in a disengaging position. Consequently, the fixing element 16 is locked at least extensively against a movement relative to the closure element 12 by means of the locking unit 18. Once the machine tool separating device 40 has been inserted by the operator, proceeding from a disengaging position of the closure element 12, the closure element 12 is pivoted about the movement axis 54 of the closure element 12 into a fixing position of the closure element 12. In dependence on the pivot movement of the closure element 12, a disengaging face 80 of the locking element 20 is moved toward the inclined face 32 of the disengaging element 28 and a disengaging face 82 of the further locking element 22 is moved toward the inclined face 34 of the further disengaging element 30. As a result of contact between the disengaging face 80 of the locking element 20 and the inclined face 32 of the disengaging element 28 and contact between the disengaging face 82 of the further locking element 22 and the inclined face 34 of the further disengaging element 30, in each case a force component is exerted in the direction of a release position of the locking element 20 and of the further locking element 22 onto the locking element 20 and the further locking element 22. As a result of the further movement of the closure element 12 into a fixing position of the closure element 12 and of the contact between the disengaging faces 80, 82 and the inclined faces 32, 34, the locking element 20 and the further locking element 22 are moved in each case in a resilient manner in opposite directions into a release position. Consequently, the locking element 20 and the further locking element 22 are forced apart relative to one another (FIG. 3) by means of the disengaging element 28 and the further disengaging element 30. Once the locking element 20 and the further locking element 22 have been moved in each case into a release position, the fixing element 16 is movable in the direction of a locking position of the fixing element 16.

As a result of a pivot movement of the fixing element 16 about the movement axis 66 of the fixing element 16, latching regions 84, 86 of the fixing element 16 are connected in a positive locking and/or non-positive locking manner to fixing bolts 88, 90 of the fixing unit 14. However, it is also conceivable for the latching regions 84, 86 to be connected in a positive locking and/or non-positive locking manner to part regions of a single fixing bolt as a result of a pivot movement of the fixing element 16 about the movement axis 66 of the fixing element 16. The latching regions 84, 86, when viewed in a plane which extends at least substantially perpendicularly to the movement axis 66 of the fixing element 16, are realized in an arcuate manner and in each case define an arcuate latching recess. The fixing bolts 88, 90 are fixed on the basic body 52. The fixing element 16, together with the fixing bolts 88, 90, forms a toggle lever fixing unit which generates a holding force in a manner already known to an expert. Consequently, the fixing unit 14 is provided for the purpose of fixing the closure element 12 in a fixing position of the closure element 12 by means of a positive locking and/or non-positive locking connection. For securing the fixing element 16 in a locking position of the fixing element 16, the fixing element 16 additionally comprises a retaining continuation 92 (FIG. 4). The retaining continuation interacts in a locking position of the fixing element 16 with a latching continuation 94 of the fixing unit 14 which is integrally molded onto the closure element 12 (FIG. 3). In addition, in a state with the machine tool separating device 40 fixed on the tool holder 36, cutting train segments of the cutting train 42 engage with the drive element for driving the cutting train 42.

For disengaging the fixing of the closure element 12 in the fixing position of the closure element 12, the fixing element 16 is pivoted in the direction of the closure element 12. In this connection, the retaining continuation 92 and the latching continuation 94 over-latch in a manner known to an expert in order to enable a movement of the fixing element 16. On account of an inner tension in the locking element 20 and in the further locking element 22 as a result of the locking element 20 and the further locking element 22 deforming into a release position, once the fixing has been disengaged, the closure element 12 is moved slightly about the movement axis 54 in the direction of a disengaging position of the closure element 12. Consequently, the locking element 20 and the further locking element 22 are moved automatically into a locking position on account of the pivot movement of the fixing element 16 up until the stop continuations 72, 74 strike against the stop faces 76, 78 and on account of the inner tension of the locking element 20 and of the further locking element 22. Consequently, the locking element 20 and the further locking element 22 abut once again against the stop element 24 and the further stop element 26 and lock the fixing element 16 at least extensively against a movement relative to the closure element 12.

The invention claimed is:

1. A closure device comprising:
    at least one movably mounted closure element configured to move between a closed position and an opened position;
    at least one fixing unit which includes at least one movably mounted fixing element configured to fix the at least one closure element in the closed position of the at least one closure element;
    at least one locking unit which includes at least one locking element having a locking position in which the at least one locking element locks the at least one fixing element against movement relative to the at least one closure element, the at least one locking element being configured to automatically move into the locking position when the at least one closure element moves from the closed position to the opened position; and
    a basic body,
    wherein the at least one closure element is configured, in the closed position, to exert a holding force on a machine tool separating device abutting the at least one closure element
    wherein, in the closed position, the at least one closure element exerts the holding force on the machine tool separating device to clamp the machine tool separating device between the at least one closure element and the basic body,
    wherein the at least one fixing element includes at least one latching region, and
    wherein the basic body includes a fixing bolt configured to engage the at least one latching region in the closed position of the at least one closure element and a locked position of the at least one fixing element.

2. The closure device as claimed in claim 1, wherein the at least one locking element is movably mounted on the at least one fixing element.

3. The closure device as claimed in claim 1, wherein the at least one locking element is a resilient member.

4. The closure device as claimed in claim 1, wherein the at least one locking unit includes at least one stop element configured to abut against and fix the at least one locking element when the at least one closure element is in the opened position.

5. The closure device as claimed in claim 4, wherein the at least one locking unit includes at least one disengaging element configured to move the at least one locking element away from the at least one stop element as the at least one closure element is moved from the opened position to the closed position to enable mobility of the at least one fixing element relative to the at least one closure element.

6. The closure device as claimed in claim 1, wherein the at least one fixing element is pivotably mounted on the at least one closure element.

7. A closure device comprising:
    at least one movably mounted closure element configured to move between a closed position and an opened position;
    at least one fixing unit which includes at least one movably mounted fixing element configured to fix the at least one closure element in the closed position of the at least one closure element; and
    at least one locking unit which includes at least one locking element configured to lock the at least one fixing element against movement relative to the at least one closure element in the opened position of the at least one closure element,
    wherein the at least one closure element is configured, in the closed position, to exert a holding force on a further element abutting the at least one closure element, and
    wherein the at least one locking element is integrally formed with the at least one fixing element.

8. A closure device comprising:
    at least one movably mounted closure element configured to move between a closed position and an opened position;
    at least one fixing unit which includes at least one movably mounted fixing element configured to fix the at least one closure element in the closed position of the at least one closure element; and
    at least one locking unit which includes at least one locking element configured to lock the at least one fixing element against movement relative to the at least one closure element in the opened position of the at least one closure element,
    wherein the at least one closure element is configured, in the closed position, to exert a holding force on a further element abutting the at least one closure element,
    wherein the at least one locking unit includes at least one stop element configured to abut against and fix the at least one locking element when the at least one closure element is in the opened position, wherein the at least one locking unit includes at least one disengaging element configured to move the at least one locking element away from the at least one stop element as the at least one closure element is moved from the opened position to the closed position to enable mobility of the at least one fixing element relative to the at least one closure element, and wherein the at least one disengaging element includes at least one inclined face configured to apply a force component to the at least one locking element in a direction of disengaging the at least one locking element from the at least one stop element as the at least one closure element moves from the opened position to the closed position.

9. A tool holder comprising a closure device that includes:

at least one movably mounted closure element configured to move between a closed position and an opened position;

at least one fixing unit which includes at least one movably mounted fixing element configured to fix the at least one closure element in the closed position of the at least one closure element; and at least one locking unit which includes at least one locking element having a locking position in which the at least one locking element locks the at least one fixing element against movement relative to the at least one closure element, the at least one locking element being configured to automatically move into the locking position when the at least one closure element moves from the closed position to the opened position, wherein the at least one closure element is configured, in the closed position, to exert a holding force on a machine tool separating device abutting the at least one closure element, wherein, in the closed position, the at least one closure element exerts the holding force on the machine tool separating device to clamp the machine tool separating device between the at least one closure element and a basic body, wherein the at least one fixing element includes at least one latching region, and wherein the basic body includes a fixing bolt configured to engage the at least one latching region in the closed position of the at least one closure element and a locked position of the at least one fixing element.

10. A machine tool comprising:

a machine tool separating device; and a tool holder that includes a closure device having:
  at least one movably mounted closure element configured to move between a closed position and an opened position;
  at least one fixing unit which includes at least one movably mounted fixing element configured to fix the at least one closure element in the closed position of the at least one closure element; and
  at least one locking unit which includes at least one locking element having a locking position in which the at least one locking element locks the at least one fixing element against movement relative to the at least one closure element, the at least one locking element being configured to automatically move into the locking position when the at least one closure element moves from the closed position to the opened position, wherein the at least one closure element is configured, in the closed position, to exert a holding force on the machine tool separating device to clamp the machine tool separating device between the at least one closure element and a basic body so as to retain the machine tool separating device in the tool holder, wherein the at least one fixing element includes at least one latching region, and wherein the basic body includes a fixing bolt configured to engage the at least one latching region in the closed position of the at least one closure element and a locked position of the at least one fixing element.

\* \* \* \* \*